(12) United States Patent  (10) Patent No.: US 9,122,391 B2
Lee et al.  (45) Date of Patent: Sep. 1, 2015

(54) SYSTEM AND METHOD OF VIRTUAL INTERACTION

(75) Inventors: Richard Lee, London (GB); Sam Coates, London (GB); Paul Kevan Grenfell, London (GB)

(73) Assignee: Sony Computer Entertainment Europe Limited (GB)

( * ) Notice: Subject to any disclaimer, the term of this patent is extended or adjusted under 35 U.S.C. 154(b) by 579 days.

(21) Appl. No.: 12/979,636

(22) Filed: Dec. 28, 2010

(65) Prior Publication Data

US 2011/0298824 A1  Dec. 8, 2011

(30) Foreign Application Priority Data

Dec. 31, 2009  (EP) .................................... 09252938

(51) Int. Cl.
*G09G 5/377* (2006.01)
*G06F 3/0488* (2013.01)
*A63F 13/30* (2014.01)
*G06F 3/01* (2006.01)
*G06F 3/0346* (2013.01)

(52) U.S. Cl.
CPC ............. *G06F 3/04883* (2013.01); *A63F 13/12* (2013.01); *G06F 3/011* (2013.01); *G06F 3/0346* (2013.01); *A63F 2300/1075* (2013.01); *A63F 2300/204* (2013.01); *A63F 2300/405* (2013.01); *A63F 2300/64* (2013.01)

(58) Field of Classification Search
CPC ....... G06Q 10/10; G06Q 40/10; G06Q 40/12; G06Q 50/01; G06Q 10/107; G06Q 30/00; G06Q 50/22; G06T 19/006; G06T 2207/10016; G06T 2219/024; G09G 5/397; G06F 3/011; G06F 3/0346; G06F 3/04883

USPC ............. 345/632–633; 455/404.2, 456.1, 459
See application file for complete search history.

(56) References Cited

U.S. PATENT DOCUMENTS 6,057,856 A * 5/2000 Miyashita et al. ............ 345/633
6,522,312 B2 * 2/2003 Ohshima et al. ................... 345/8
2004/0257273 A1* 12/2004 Benco et al. ................ 342/357.1

(Continued)

OTHER PUBLICATIONS

Henrysson A et al: "Face to Face Collaborative AR on Mobile Phones". Fourth IEEE and ACM International Symposium on Mixed and Augmented Reality,Vienna, Austria, Oct. 5-8, 2005, Piscataway, NJ, USA,IEEE. pp. 80-89, XP010856763.

(Continued)

*Primary Examiner* — Ke Xiao
*Assistant Examiner* — Kim-Thanh T Tran
(74) *Attorney, Agent, or Firm* — Lerner, David, Littenberg, Krumholz & Mentlik, LLP

(57) ABSTRACT

A system for virtual interaction, comprising two or more portable electronic devices, is provided. Each device comprises, in turn, coordinate referencing means operable to define a coordinate system common to the portable electronic devices with respect to a physically defined reference position, position estimation means operable to detect a the physical position of its respective portable electronic device with respect to the reference position, virtual environment generation means operable to generate a virtual environment, and communication means operable to transmit positional data using the common coordinate system from that portable electronic device to another portable electronic device. The virtual environment is shared in common between the portable electronic devices. The virtual environment uses the common co-ordinate system within which each portable electronic device defines a position for itself responsive to its physical position with respect to the reference position.

15 Claims, 8 Drawing Sheets

(56) References Cited

U.S. PATENT DOCUMENTS

| | | | |
|---|---|---|---|
| 2005/0239477 A1* | 10/2005 | Kim et al. | 455/456.1 |
| 2009/0244097 A1* | 10/2009 | Estevez | 345/633 |
| 2009/0264150 A1* | 10/2009 | Andreasson et al. | 455/556.1 |
| 2009/0285492 A1* | 11/2009 | Ramanujapuram et al. | 382/209 |
| 2010/0287485 A1* | 11/2010 | Bertolami et al. | 715/764 |
| 2010/0287500 A1* | 11/2010 | Whitlow et al. | 345/633 |

OTHER PUBLICATIONS

Wagner D et al: "History and Future of Tracking for Mobile Phone Augmented Reality". International Symposium on Ubiquitous Virtual Reality, 2009. ISUVR '09, IEEE, Piscataway, NJ, USA, Jul. 8, 2009. pp. 7-10, XP031526025.

A. Henrysson, M. Billinghurst, M. Ollila: "AR Tennis". Proceeding SIGGRAPH '06 ACM SIGGRAPH 2006, Boston, MA, USA., Jul. 30, 2006-Aug. 3, 2006. pp. 1-1, XP040050758.

You S et al: "Hybrid inertial and vision tracking for augmented reality registration". Proceedings IEEE 1999 Virtual Reality. Houston, TX, March 13-17, 1999, New York, NY : IEEE, US, Mar. 13, 1999. pp. 260-267, XP000887668.

Jiang B et al: "A robust hybrid tracking system for outdoor augmented reality". Proceedings of Virtual Reality, 2004 . . . IEEE Chicago, IL, USA Mar. 27-31, 2004, Piscataway, NJ, USA,IEEE, US, Mar. 27, 2004. pp. 3-275, XP01 0769450.

European Search Report, EP 09252938 dated Apr. 11, 2011.

* cited by examiner

SYSTEM AND METHOD OF VIRTUAL INTERACTION

CROSS REFERENCE TO RELATED APPLICATIONS

The present application claims the benefit of and priority to EP Application No. 09252938.7, filed Dec. 31, 2009, the entire disclosure of which is incorporated by reference herein.

BACKGROUND OF THE INVENTION

1. Field of the Invention

The present invention relates to a system and a method of virtual interaction.

2. Description of the Prior Art

In conventional so-called 'augmented reality', a representation of a real environment is combined with (i.e. augmented by) a representation of a virtual environment.

A virtual environment is an environment constructed in a computer; that is to say, a computer-simulated environment which represents a simulation of the real world, a simulation of an imaginary world or combinations of the two. Most virtual environments are primarily visual and possibly audible in nature, and a user of the computer can interact with or move within the virtual environment by operation of the computer's controls. For example, a virtual environment may contain different rooms, through which the user can walk (in a virtual sense, i.e. within the computer simulation) by operating various controls. In each virtual room, the user would see sights (e.g. on a display screen) and/or hear sounds (e.g. via a loudspeaker or headphones) associated with the user's position and orientation in that room. Some virtual environments allow other types of sensory interaction by a user, for example by providing tactile feedback to the user. This is a feature which is common in gaming and medical applications.

Representations of the real environment typically take the form of captured video images, in which case a combined image comprising some or all of the captured video images and some or all of the graphically rendered virtual environment can be displayed. Other representations of the real environment may also be used, such as global positioning system (GPS) information coupled with some knowledge of the real environment (e.g. a map).

Thus in conventional augmented reality systems, a device captures some representation of the real environment (such as a video image, and/or GPS information), and augments that representation with elements of a virtual environment generated by the device. The virtual elements are related to the real environment either with respect to a detected position of the device (e.g. a GPS signal coupled with a map held within the device), and/or by analysis of captured video images to identify features to which the virtual elements can be related.

A variant on augmented reality is so-called 'virtual reality'; in this case, a graphical representation of a virtual environment is presented without being combined with a representation of the real environment. Therefore in conventional virtual reality systems there is not necessarily a requirement to capture a representation of the real environment.

Accordingly, in the present application, the term "virtual environment" implies a computer-simulated environment which represents a simulation of the real world, an imaginary world or combinations of the two, and which may or may not be augmented by images or other information derived from the real world. "Virtual interaction" implies an interaction taking place within the virtual environment, although of course that interaction may well be initiated or controlled by users (as parties to the interaction) operating controls in the real world.

However, for both augmented reality applications and virtual reality applications, there is scope to improve upon how elements of the virtual environment relate to the real environment, thereby providing further modes of interaction in augmented and virtual reality applications.

It is an object of the present invention to mitigate or alleviate the above problems.

SUMMARY OF THE INVENTION

In a first aspect, a system for virtual interaction, comprising two or more portable electronic devices, each device comprising in turn, coordinate referencing means operable to define a coordinate system common to the portable electronic devices with respect to a physically defined reference position, position estimation means operable to detect a the physical position of its respective portable electronic device with respect to the reference position, virtual environment generation means operable to generate a virtual environment, and communication means operable to transmit positional data using the common coordinate system from that portable electronic device to another portable electronic device, and in which the virtual environment is shared in common between the portable electronic devices, the virtual environment using the common co-ordinate system within which each portable electronic device defines a position for itself responsive to its physical position with respect to the reference position.

In another aspect, a method of virtual interaction between two or more portable electronic devices comprises the steps of defining a coordinate system common to the portable electronic devices with respect to a physically defined reference position, estimating the physical position of at least one portable electronic device with respect to the reference position, generating a virtual environment, and communicating positional data between the portable electronic devices using the common coordinate system, and in which the virtual environment is shared in common between the portable electronic devices, the virtual environment using the common co-ordinate system, and for each portable electronic device, defining its position in the shared virtual environment responsive to its physical position with respect to the reference position.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE EMBODIMENTS

A system and method of virtual interaction are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

In an example embodiment of the present invention, a system for virtual interaction comprises a pair of portable electronic devices (PEDs) each having a display, a video camera, and motion sensors such as accelerometer and/or gyroscopic sensors. In addition the PEDs each comprise a wireless communication means such as a Bluetooth® link. Users of the two PEDs temporarily bring them into contact with one another, for example by touching them back-to-back. From that shared initial position, the motion sensors in each PED track that PED's respective movements and hence the PED's position with respect to the shared initial reference position.

The PEDs can now share a common virtual environment in which each PED can generate virtual features with respect to its own position and viewpoint, and (with suitable communication of the generated features and relative positioning) the other PED can present those virtual features to its own user in a manner consistent with both the virtual and real (physical) positions of the PEDs relative to one another.

Thus, for example, the PEDs could be used in a game of tennis where, having established a shared reference position, a first PED is swung to launch or serve a ball, and each PED can display the environment (via the video camera) and show the virtual ball flying through it; the second PED can then be physically positioned to catch or hit the ball in turn at the corresponding position in the virtual environment, thereby creating a rally between the players based on a virtual object shared between the PEDs in a common virtual environment.

A detailed description will now be provided.

Figure 1A:
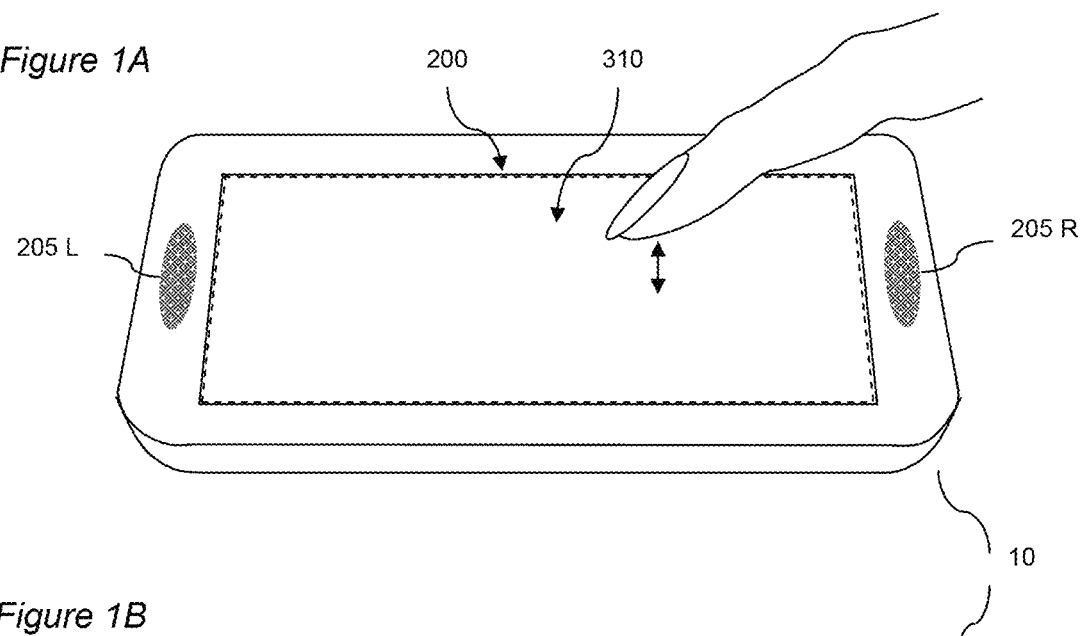
FIGS. 1A and 1B are schematic diagrams of a portable electronic device in accordance with an embodiment of the present invention.
Figure 1B:
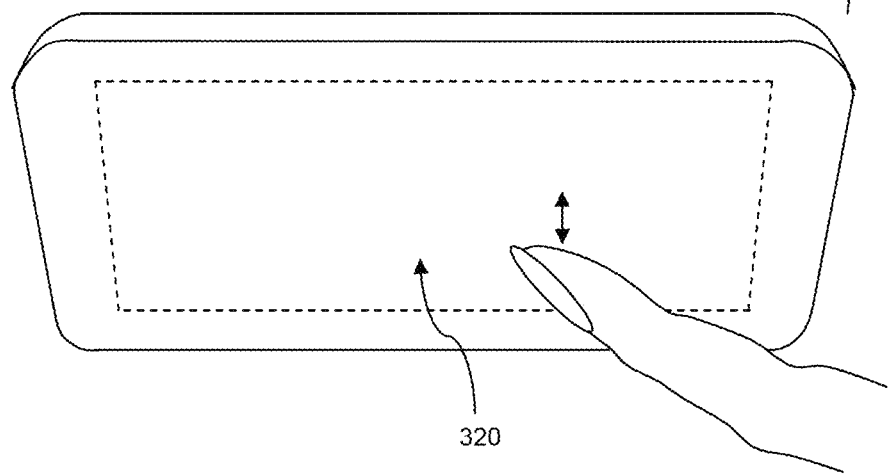

FIGS. 1A and 1B illustrate an embodiment of a portable electronic device (PED) 10. FIG. 1A shows a notional front or top face of the PED, whilst FIG. 1B shows a notional rear or bottom face of the PED. The front and rear faces are substantially parallel to one another.

On the front face, the PED comprises a display 200 and optionally one or more loudspeakers 205L, 205R.

On the rear face, the PED optionally comprises a rear touch sensitive surface 320 (indicated by the dotted lines) having similar dimensions to the display 200. The rear touch sensitive surface is positioned so as to be substantially aligned with the display. That is to say, considered in a direction normal to the plane of the display, the rear touch sensitive surface substantially overlies the display.

Optionally, a transparent front touch sensitive surface 310 (indicated by the dotted lines in FIG. 1A) is also provided coincident with the display 200. The front and rear touch sensitive surfaces and the display thus have similar dimensions and placements on their respective faces of the device. The touch sensitive surfaces also have a similar resolution of touch localisation.

Figure 2:
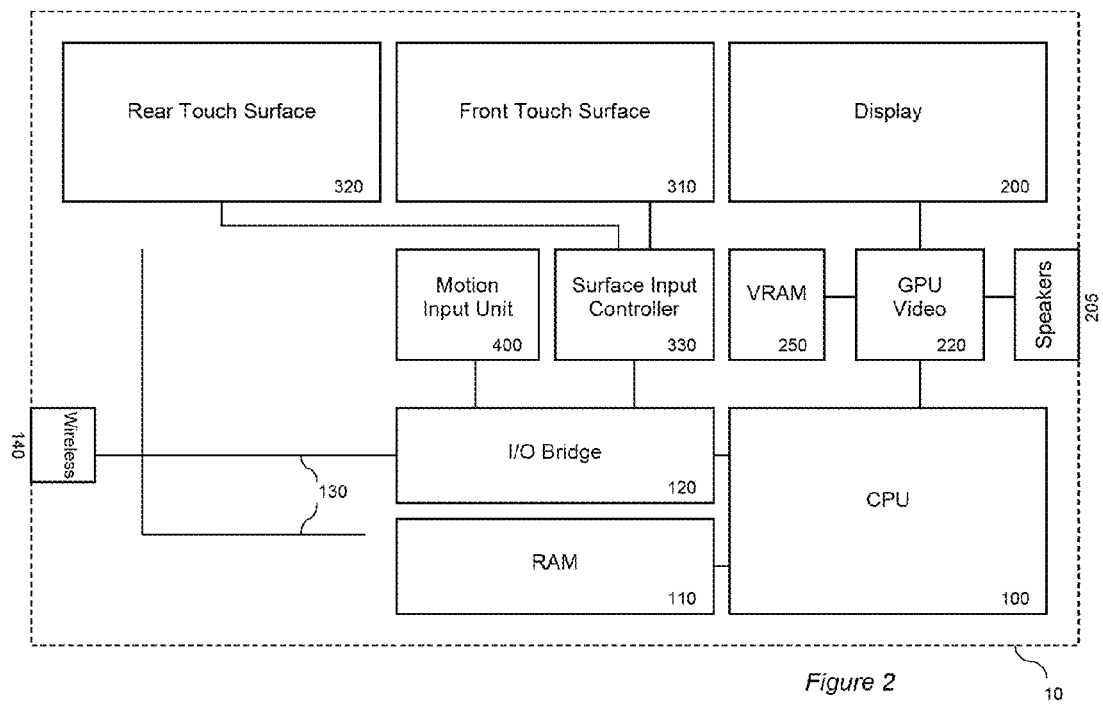
FIG. 2 is a schematic diagram of a portable electronic device in accordance with an embodiment of the present invention.

Referring now to FIG. 2, an embodiment of the PED comprises a central processor (CPU) 100 coupled to random access memory (RAM) 110, and optionally to a read only memory (not shown). In addition the CPU communicates with a graphics processing unit (GPU) 220. The GPU has access to video RAM (VRAM) 250. The GPU outputs audio to loudspeakers 205L,R (only one shown for clarity) and/or to a headphone jack socket (not shown). The GPU also outputs video information to the display 200. The display is typically a liquid crystal display (LCD) but may be an organic light emitting diode display (OLED) or similar suitable display technology.

In operation, the CPU and GPU can, under suitable software instruction, generate a virtual environment (such as a game environment) or a part of such a virtual environment, for display either on its own as a virtual reality or as part of a display of augmented reality. As such these constitute a virtual environment generator.

In addition, the CPU communicates with an input/output bridge (I/O bridge) 120 that co-ordinates communication with peripheral components both integral to and linkable with the PED. In an embodiment of the PED the I/O bridge communicates with a surface input controller 330, which parses inputs from the rear touch sensitive surface 320 and optionally the transparent front touch sensitive surface 310. The I/O bridge also communicates with a motion input unit 400 comprising one or more micro electromechanical (MEMs) accelerometers and/or gyroscopes, to provide up to six axes of motion input (x, y and z axis lateral movement and roll, pitch and yaw rotational movement). The I/O bridge also communicates with a bus 130, upon which various peripheral devices may be linked, including one or more wireless communication units 140, such as for example WiFi and/or Bluetooth® communication units, each operable as a communicator to other PEDs.

It will be appreciated that the CPU 100 may be a single core or multi core processor. Similarly, the RAM may be dynamic RAM or may comprise both dynamic RAM and static (e.g. flash) RAM units. Likewise, whilst the GPU typically uses dedicated VRAM, alternatively or in addition it may share common RAM with the CPU. Finally, it will be appreciated that the function of the surface input controller 330 may be performed by the CPU itself.

The optional rear touch sensitive surface may be a conventional capacitance touchpad or panel such as that found in laptop computers or portable telephones. Such a touchpad typically comprises two layers of parallel conductive lines separated by an insulator and arranged at right angles to one another. A high frequency signal is swept through every respective pairing of lines between the two layers. The measurable current for each pair is then proportional to the capacitance at their point of intersection. When a user's finger is placed at or near that intersection, however, some of the electrical field between layers is shunted to ground, changing the effective capacitance and hence the measured current. Precise localisation of the user's finger can be achieved by measuring changes in capacitance at nearby points of intersection, which will be proportional to their respective distances from the finger. So-called multi-touch operation of the touchpad can be achieved by detecting distinct peaks in capacitance change at separate intersection points on the pad. Meanwhile, movement of a user's finger or fingers can be estimated from successive points of intersection where contact is detected.

The optional front touch sensitive surface for use with the display operates in a similar manner to the rear touch sensitive surface, but in this instance the conductive lines are typically transparent (as a non limiting example, being formed by a deposition of indium tin oxide), and the insulator between two layers is provided by all or part of the display window (e.g. a glass layer); typically a further transparent protective layer is then provided on top of the upper conductive layer.

It will be appreciated however that any suitable touch sensitive technique may be used for either touch panel.

It will also be appreciated that whilst not shown in the figures for the purposes of clarity, the PED comprises power distribution lines to various components and one or more sources of power, such as an input socket (for example a conventional DC power socket, or alternatively or in addition a USB socket). Such an input socket may also be used to charge one or more batteries (also not shown). Such batteries may be user removable or may be sealed in the device. Other components not shown include, for example, an optional microphone.

Figure 3:
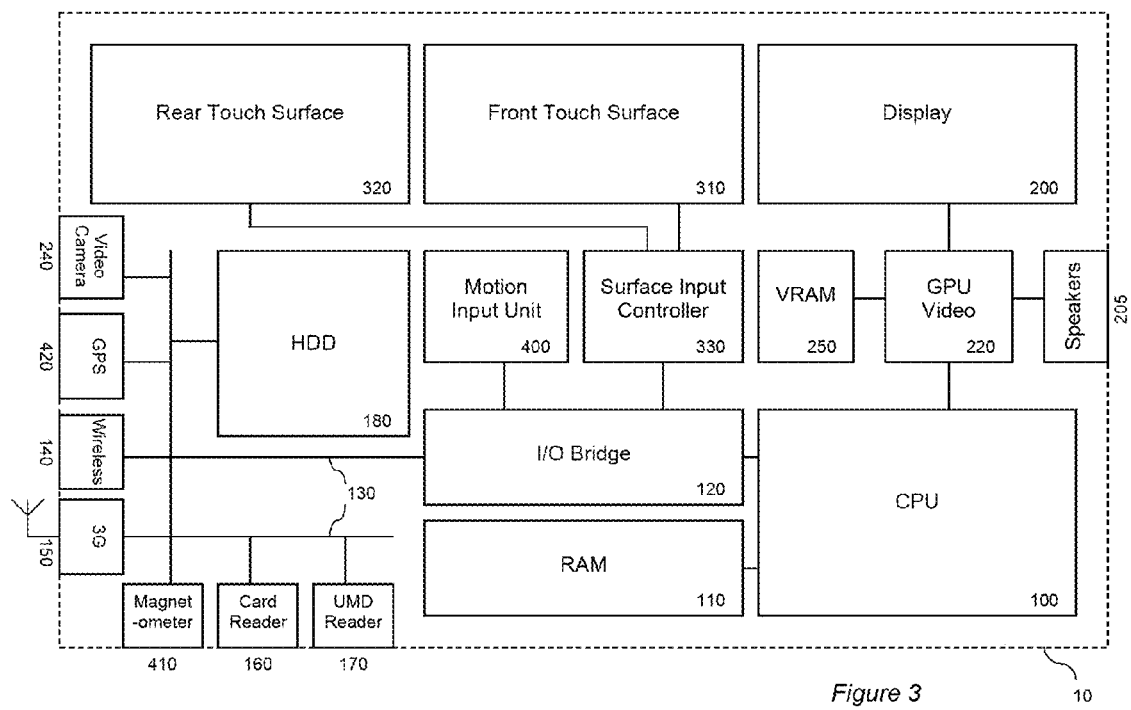
FIG. 3 is a schematic diagram of a portable electronic device in accordance with an embodiment of the present invention.

Referring now also to FIG. 3, an embodiment of the PED may comprise one or more additional components, either integrated within the device or connectable to it. Such additional components include, but are not limited to, the following.

a) A card reader 160 suitable for reading from and optionally writing to memory cards, such as a Sony® Memory Stick® card, or alternatively legacy memory cards such as those used by the Sony® Playstation 2® entertainment device. Such a reader may be integral to the PED or may connect to the bus 130 via a USB connection.

b) A universal media disk (UMD) reader 170 or other optical disk reader (such as a DVD or Blu-Ray® disk reader), for accessing media and/or game content stored thereon. Such a reader may be removably connectable to the bus 130 via a USB or proprietary connection.

c) A magnetometer 410 for determining compass direction (i.e. the current absolute orientation of the PED), mounted integral to the PED either on the bus 130 or as part of the motion input unit 400.

d) A third generation (3G) or other mobile telephony module 150. In an embodiment, the module and aerial are integral to the PED, and optionally the aerial is shared with or otherwise coupled electromagnetically with other wireless units in the device for the purpose of transmission and reception. Alternatively the module may be removably connectable to the PED, for example via USB port or a Personal Computer Memory Card International Association (PCMCIA) slot.

e) A hard disk drive (HDD) 180 integral to the PED, providing bulk storage for audio/video media, downloaded games, and the like.

f) A GPS receiver 420. Again the GPS receiver may share an aerial with one or more other wireless units (such as WiFi) within the PED, or may use its own aerial. Map information, where used, may be stored locally at the receiver, or in flash RAM of the PED, or on an HDD of the PED.

g) A video camera 240, typically comprising a charge coupled device (CCD) optical sensor and suitable optics for imaging onto the CCD. The resolution of the CCD may for example be 640×480 pixels, but may be any suitable resolution, such as for example 1920×1080 pixels (full HD). In an embodiment the video camera is integral to the PED, but alternatively may be removably connectable to the bus 130 via a USB or proprietary connection. An embodiment of the PED comprises two such video cameras 240, forming a stereoscopic pair.

In operation, the CPU accesses an operating system that is resident for example on a ROM, flash RAM or a hard disk. The operating system co-ordinates operation of the various functions of the PED and presents a user interface to a user of the device. The user interface will typically comprise graphical outputs via the display and touch based and/or motion-based inputs, but may also include audio outputs and/or inputs.

Where a rear touch panel is provided, touch based inputs to the PED are peculiar to the arrangement of a display on the front of the PED and a correspondingly positioned touch sensitive surface (or 'panel') on the rear of the PED. This allows the user to treat the rear panel as a proxy for the display (in other words, address actions and inputs to the rear touch panel as if to the display, and/or point to the rear panel in order to point to the display). Thus for example, the user can point to icons or other displayed features from apparently underneath the display by touching the rear touch panel at the corresponding position.

It will be appreciated that unlike a laptop touch panel, the rear touch panel can have a substantially 1:1 scale relationship with the screen, thereby not just enabling motion of a mouse pointer on screen that corresponds to motion of touch on the panel (for example), but furthermore also enabling direct placement of such a mouse on the screen at the position corresponding to the touch on the panel, because as noted above the panel can be understood to represent the screen (i.e. act as a proxy). In other words, the rear touch panel has substantially the same size, shape and orientation as the screen. However, it is possible in other embodiments that the rear touch panel could have a different size, for example being smaller than the screen. In this arrangement, however, maintaining substantially the same shape and orientation as the screen means that the user can easily relate portions of the rear touch panel to corresponding screen positions. If the rear touch panel is smaller than the screen it does not have to be positioned on the device symmetrically behind the screen, but it can aid use of the device if the rear touch panel at least mainly overlaps the screen position.

Because of the relative orientation of the display and the rear touch panel, left-to-right mapping across the rear touch panel is therefore reversed to correspond to the appropriate position on the display. This means that detection of a movement in a certain side to side direction (as viewed when looking at the back of the device) has to be reversed in order that the movement can be applied to a screen event which is viewed from the front of the device. In other words, a left to right movement (as viewed from the rear) actually corresponds to a right to left movement as viewed from the front of the device. The user, holding the device so that the screen is facing him, perceives that he is moving his finger from right to left along the rear touch panel, but the panel itself, facing away from the user, detects this movement as a left to right movement. This movement detection is therefore reversed before being applied to a screen event, in order that the screen event (e.g. moving a cursor) occurs from right to left as seen by the user.

Optionally this direction reversal is switchable depending on the orientation of the device as detected by the motion input unit, and/or according to what peripheral devices are connected; for example if the PED were connected to a television and then held display-down for use, the left-to-right mapping of the touch panel input may not be reversed because the rear touch panel would then in fact be on the top of the device, facing the user.

Use of the rear touch panel as a proxy for the display advantageously allows interaction with the graphical output of the device without the user's hand or fingers obscuring the display or marking the display window.

In addition, the subjective experience of controlling the displayed interface from behind or underneath the screen allows for new modes of user interaction; for example selection, highlighting or magnification of a screen element may be achieved by a user pushing the element 'toward' them (i.e. with finger pressure on the rear panel) from behind the device. For a capacitance based touch panel, an increase in pressure on the rear panel (i.e. a push) can be detected by a flattening of the user's finger, which results in a larger covered area and hence more points of intersection in the panel having reduced capacitance. Conversely a reduction in pressure reduces the number of intersection points where touch is detected.

In conjunction with a similar but transparent front touch sensitive surface overlaid on the display, further modes of interaction become possible. For example, displayed objects may be selected by being pinched between thumb and forefinger, with the thumb and forefinger touching the front and back touch panels respectively. The object may then be moved around, and, for example, activated by using a squeezing action between thumb and forefinger.

Further modes of interaction rely on the correspondence between position and/or motion of the user's fingers on the two touch panels. For example in a video playback application, stroking a finger across only the top touch panel may be interpreted as a fast-forward or rewind command (depending on direction), whilst a pinch hold followed by corresponding movement left or right of both fingers may be interpreted as selection of a specific point in playback (i.e. where the total playback time is scaled to the width of the touch panels). By contrast, however, a pinch hold followed by both fingers moving in opposite directions to one another may be interpreted as a twisting action, and adjusts a virtual volume dial. A similar grammar of interaction could be used for example for document or e-book navigation, with scrolling, page selection and zoom replacing the above playback functions.

Figure 4A:
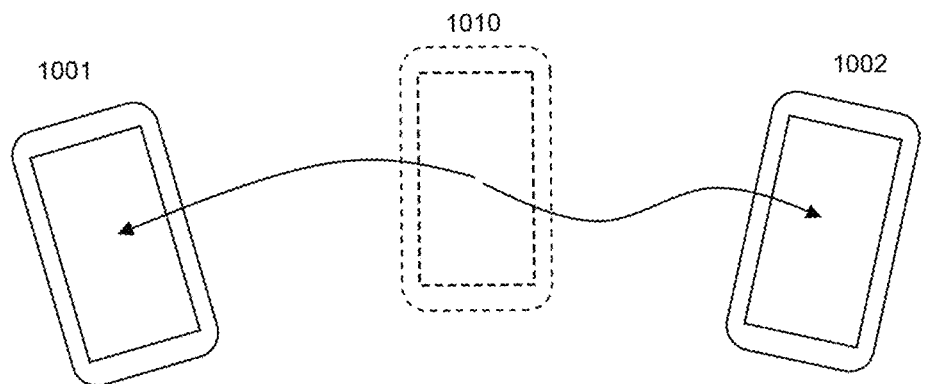
FIGS. 4A to 4C are schematic diagrams illustrating modes of position estimation in accordance with an embodiment of the present invention.
Figure 4B:
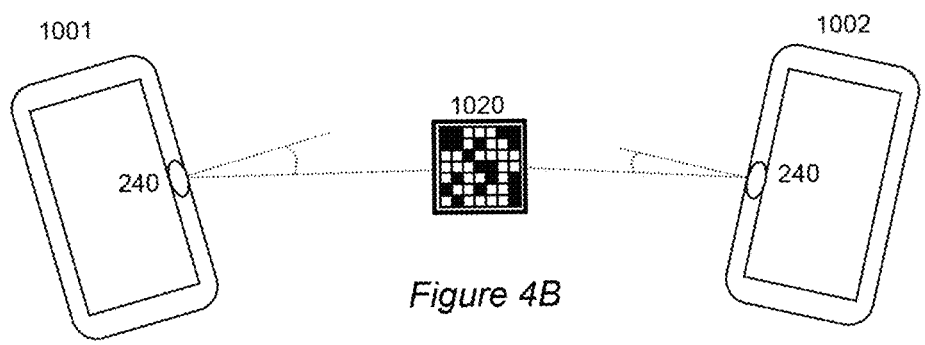
Figure 4C:
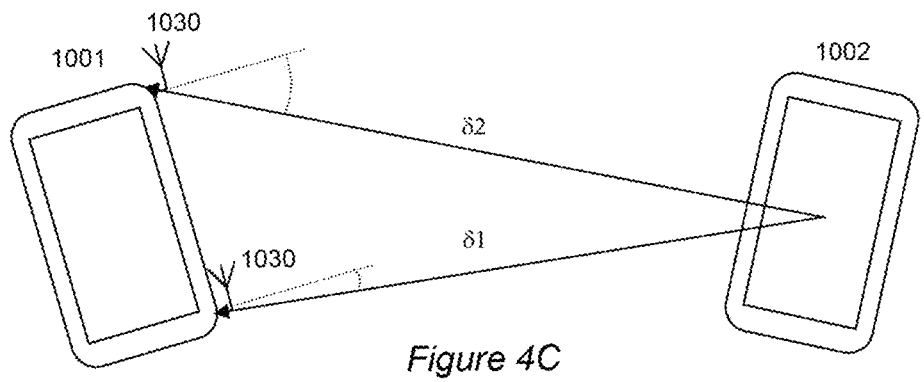

Referring now to FIGS. 4A to 4C, in an embodiment of the present invention, two PEDs establish their positions relative to one another within both a real, physical environment and a shared virtual environment.

In FIG. 4A, the PEDs are physically placed adjacent to one another (for example by being placed back to back) to define a common position, and this is set as a common reference position 1010, either by the PEDs detecting contact with one another at this position (for example by electrical contact and handshake) or by the users activating a control on their respective PED. Because the PEDs are adjacent to one another, of course they cannot both actually occupy exactly the same common reference position. However, the exact position used to define the common reference position may take account of the physical bulk of the PEDs by including a predefined spatial offset, or the difference between the common reference position and the PEDs' own sensor position (or accuracy) may in fact be so small as to be negligible and so there is no need to correct for it. Thus more generally each PED may record an approximation of the common reference position that is close enough for subsequent use.

The common reference position is also used in a shared virtual environment. The shared virtual environment is a virtual environment that uses a co-ordinate system that is common to (i.e. shared between) two or more PEDs. As noted above, the PEDs define their positions relative to one another in the real environment at the common reference position, and this is then replicated in the shared common co-ordinate system of the shared virtual environment, for example by setting the common reference position as the origin of the shared co-ordinate system.

At a most basic level, the only data that needs to be communicated between PEDs or to a PED to establish the shared virtual environment in this example is the fact that a PED is at or very close to the common reference position, or a single instance of the PED's current displacement from the common reference position. After that, each PED can define the shared virtual environment with respect to the its own position relative to the common reference position, on the basis that the shared virtual environment and the real (physical) environment have a 1:1 (or other pre-agreed) mapping in terms of distance and direction with respect to the common reference position. It is however possible for the PEDs to exchange further data defining the shared virtual environment, for example its boundaries (described below) or virtual features or appearances of the shared virtual environment.

Any relevant events in the virtual environment can then be communicated between the PEDs (for example via wireless transmission means 140) using the common co-ordinate system, as described in more detail later. In this way, events in the virtual environment are referenced with respect to a physical reference position.

So, at a most basic level in an example embodiment, it can be considered that the CPU 100, a wireless interface 140, and optionally the video camera 240 and motion input unit 400 together provide a coordinate referencing arrangement (i.e. a coordinate referencer). Also, at a most basic level, only a single instance of positional data has to be exchanged between the PEDs in order to establish the common coordinate system, and indeed this may in fact be a one-way transfer of data (one PED telling another PED where the first PED is positioned and oriented relative to the second PED). The CPU 100 and the wireless interface 140 cooperate to provide an arrangement for doing this communication. However, it is potentially more reliable if the PEDs exchange position data more than once, for example frequently during a session of virtual interaction in the shared coordinate system.

Then, as described below, subsequent relative movements of the PEDs in the real environment can be replicated in the virtual environment. It will be appreciated therefore that the real and virtual positions of a PED will substantially coincide.

The PEDs can calculate their current physical and virtual positions with respect to the common reference position using one or more of the methods described below. Each of these methods, as implemented by respective parts of the device shown in FIG. 3, provides a position estimation arrangement (i.e. a position estimator).

Subsequent movement away from the common reference position may be tracked by the CPU 100 and/or the motion input unit 400 (acting as a motion tracking arrangement or motion tracker) using the one or more accelerometers and/or gyroscopes (motion sensors) of the motion input unit to maintain a cumulative change in displacement and orientation with respect to the common reference position. The relationships between acceleration, velocity and displacement (both laterally and rotationally) are well known and not described in detail herein. Whilst accelerometers and gyroscopes may be mentioned separately or mentioned collectively as motion sensors, it will be understood that accelerometers and gyroscopes can be also be collectively considered to be accelerometers, with the primary distinction being the lateral or rotational nature of the detected acceleration.

Alternatively or in addition to accelerometer-based motion tracking, subsequent movement away from the common reference position may be tracked by use of a so-called 'optical flow' method, in which motion of video images captured by video camera 240 (i.e. net motion of a sequence of images, not motion of objects within the images) is detected (e.g. by the CPU 100 acting as an optical flow estimation arrangement or optical flow estimator), and the physical motion of the PED required to account for the detected image motion is then calculated. Using this calculated motion, again a change in displacement and orientation with respect to the common reference position can be estimated, and from the cumulative estimated changes, an estimate of physical position can thus be updated. Again, optical flow is a known technique and for clarity is not described in further detail here.

Where both of the above methods (motion tracking and optical flow) are used to determine displacement and/or orientation, one can be used to validate the other, or alternatively one method may be used as the primary basis for position calculation with the other method being used to detect a failure or inconsistency in the primary result, and then optionally substitute until the primary mechanism recovers. Strategies for combining results and dealing with failures and inconsistencies are described later here.

Where there are more than two PEDs, an initial common reference position is still established between two PEDs, and further common positions are then temporarily made by successive pairs of PEDs, each pair including one PED from a previously established common position. New PEDs can thus relate their positions back to the initial common reference position using the intervening cumulative change in position of the PED with which they established their temporary common position. In this way all the PEDs can establish how they physically relate to the common reference position 1010.

Referring now to FIG. 4B, alternatively or in addition to using a common physical reference position as in FIG. 4A, a reference object within the real environment may be used as a reference position, such as an AR marker 1020. Typically such a marker comprises an asymmetric pattern to reduce ambiguity with respect to the direction from which it is being viewed. In addition it is typically of a sufficient size that distortion of the AR marker in the captured video image due to the viewing angle can be adequately resolved by the video camera of each device during common usage (for example within a room), and the AR marker can be resolved over normal operating distances (as relative size indicates distance). Thus typically the operating range of the PEDs is dependent upon the size of the AR marker and the resolution of the camera but, as non-limiting examples, the AR marker may be an A4-size pattern, and the range may be up to 5 meters. More generally, detected distortion characteristics in a captured video image of the AR marker that can be used to estimate position include changes in scale, rotation and/or perspective. It will be appreciated that in this case, the or one AR marker can be treated as a common reference position for a common co-ordinate system, as described previously. The CPU 100 acts with the video camera 240 to provide an image processing arrangement or image processor to achieve these functions.

In some situations the reference object may always be in view (for example if placed between players of a virtual tennis game) but more generally it will be appreciated that more than one reference object within the environment can be used. This is of particular benefit when use of one or more of the devices will cause it to lose its view of the first reference object.

It will be appreciated that in circumstances where a device loses its view of a (or any) reference object, or its view becomes ambiguous or difficult to resolve, then optionally optical flow and/or motion sensor tracking can be used until the view of a reference object is reacquired. Similarly, the view of a reference object may become ambiguous for example if a light reflection or motion blur distorts the asymmetric pattern, and it may become difficult to resolve either at large distances or when the viewpoint approaches an edge-on view (so that, in effect, one dimension of the reference object is compressed in the captured image to a point where there is not enough resolution in that dimension to adequately represent it).

It will of course be appreciated that optical flow and/or motion sensor tracking can also be used in conjunction with normal tracking of a reference object.

It will also be appreciated that alternatively or in addition to an AR marker, a reference object can be one that is native to the environment; for example a window, television screen or other light source, or a tabletop.

Referring now to FIG. 4C, alternatively or in addition the devices triangulate one another's physical positions based upon wireless signals transmitted from one device to the other (for example including data identifying the respective device), and use of spatially separate antennas 1030 (shown in FIG. 4C only on one device for clarity, but it will be appreciated that both devices could be similarly equipped). Such antennae on a recipient device may determine the distance and relative angle of signals from a transmitting device both from path length differences ($\delta 1-\delta 2$), obtained for example by cross-correlating signals received from the separate antennas, and also from the analysis of relative received signal strengths; differences in signal strength between antennas at the same moment in time can indicate directionality if each antenna has directionally dependent sensitivity (typically taking the form of so-called 'lobes' of different sensitivity); thus the same signal will have a different apparent strength depending on the relative direction of reception. To enhance discrimination of such direction information, one or more such directional antennas may be used that are oriented at different angles (e.g. orthogonally) to one another, so that different lobe sensitivities can be compared simultaneously. Meanwhile, changes in overall signal strength at multiple antennas, and/or changes in path length, indicate the separation between devices. Path length can be determined, for example, by use of clocks in each device and a timing signal in the transmission. Differences in timing between the local clock and the received timing signal indicate the path length. In this case, the common reference position for a common co-ordinate system may be centred upon one of the PEDs. Of course, rather than (or in addition to) using separate receiving antennae, separate antennae on a transmitting device could send separate signals which could then be compared (e.g. for signal strength, cross-correlation or directional characteristics) by a single antenna or multiple antennae at a receiving device.

Accordingly, for the triangulation system, at least one PED acts as a wireless identification signal transmitter, and at least another PED acts as a wireless triangulator, so that one or both PEDs triangulate their relative position. If only one of a pair of PEDs carries out this function, it transmits data defining the relative position to the other PED.

Again it will be appreciated that any of the techniques described in relation to FIGS. 4A and 4B can be used in combination with the above wireless triangulation technique.

In respect of any of the above techniques, it can reasonably be assumed that movement of each device, whilst potentially frenetic (for example in a tennis rally), nevertheless should be consistent from one moment to the next. Consequently, motion prediction (for example by use of a Kalman filter) may also be used to supply an estimated position in the event that the one or more position estimation methods in use fail to provide an estimate (for example due to momentary occlusion of the camera). Similarly, such prediction can be used to detect if any one position estimation technique may be making an error (i.e. generating an inconsistent result, or a result outside a threshold deviation from a predicted result) and so should be discounted from any combined estimation of position.

Combined estimations may simply average the position estimate of two or more of the above position estimators, or may use whichever estimation technique can be expected to give the best result at any given moment, such as for example in the case where motion sensor tracking and video reference to an AR object are running concurrently, as described below.

Firstly, in a case where the arrangements of FIGS. 4A and 4B are both used, the positional relationship between the common reference position 1010 and the AR marker 1020 may be determined so that a smooth handover between the two methods can be achieved, and/or any disparity in estimates between the two techniques can be tracked. For example, a PED may determine its position relative to both the common reference position and the AR marker, and so determine the relation directly between the AR marker and the common reference position, so that knowledge of one can be used to calculate or verify the position of the other.

Also, one of the methods may be selected in preference as the primary position estimation method, although its output may be checked or adjusted by a secondary estimation method. This may be selected by the device in isolation, or it may be selected by both devices so that both devices always operate using the same method; thus, for example, whilst one device may have a clear view of the AR marker, the other device may not have a clear view and so both devices switch to using their motion sensor tracking, only switching back to use of the AR marker when both devices have a clear view.

The order of preference of method may depend on the application. For example, for interactions with respect to a game board or other paraphernalia associated with a game, the use of AR markers is likely to be preferable, with motion sensor tracking acting as a backup facility. By contrast a fast-moving game such as indoor virtual tennis may use motion sensor tracking in preference because of a difficulty in determining optical flow between successive image frames that do not show enough (or any) overlapping features. An outdoor game where large distances are involved and there are few distinct visual features may use wireless triangulation backed up by motion sensor tracking The methods used may therefore be a matter of selection by an application designer.

Figure 5A:
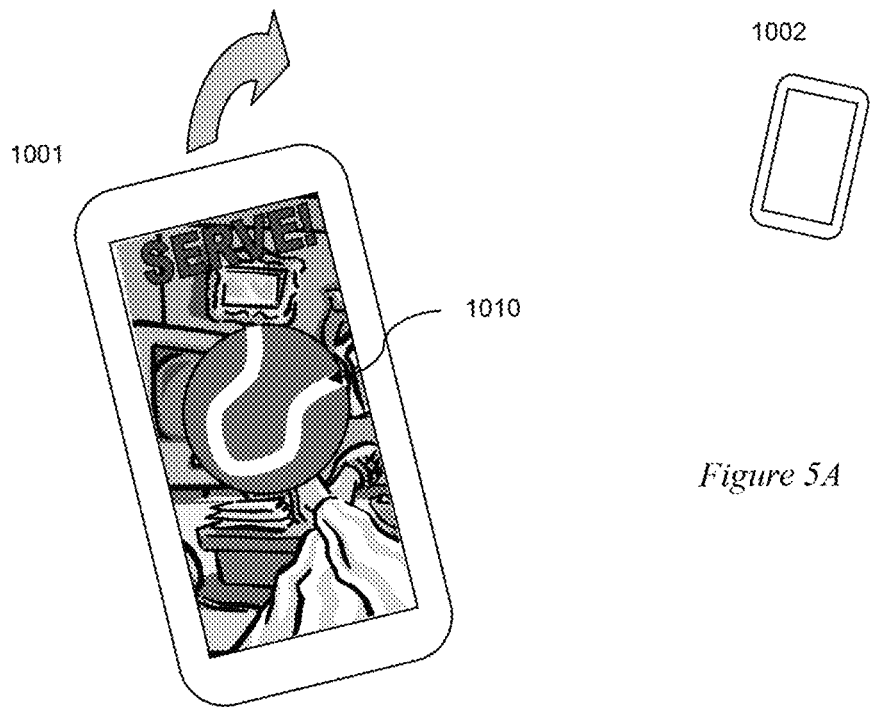
FIGS. 5A and 5B are schematic diagrams illustrating an application operating in a shared virtual environment in accordance with an embodiment of the present invention.
Figure 5B:
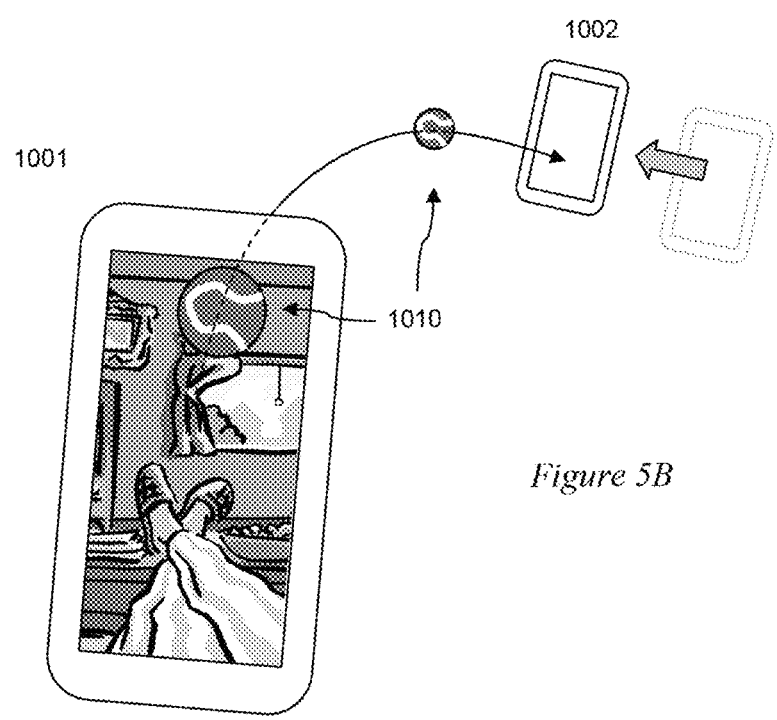

Referring now to FIGS. 5A and 5B, an example of the operation of two PEDs is described in accordance with an embodiment of the present invention.

In FIGS. 5A and 5B, the PEDs each comprise a video camera 240 that faces (or can be turned to face) in the opposite direction to the display screen. The display screen can thus display the view captured by the camera behind the display screen, potentially in conjunction with virtual features of the generated virtual environment. With suitable optics on the camera, and/or suitable shifting and scaling of the captured image, the screen can therefore be arranged to appear like a window through the device, displaying all or part of the view from the camera that is consistent with a view through an aperture in the device the same size as the screen.

In FIG. 5A, the PEDs have established their current position with respect to one another within a shared virtual environment using one or more of the techniques mentioned herein. As is described above, the shared virtual environment comprises a set of common co-ordinates used by the PEDs, in which optionally virtual objects can be positioned.

The PEDs' CPUs (using data stored in their RAM 110 and/or HDD 180, for example) each provide an arrangement for generating a virtual environment relating to the common coordinate system. That is to say, they provide an environment as a framework in which virtual interactions may take place. Of course, in order that the virtual environment is made interesting for the users, it is preferable that virtual visual, audible and/or tactile game features are generated within the virtual environment. It is not essential that in the instance of a common game between two PED users, the virtual environments are identical, only that the coordinate systems are shared. In many applications, however, the virtual environments generated by the two or more PEDs will be the same, for example being defined by common game software code.

As an example, the users of the PEDs have now initiated a tennis game. A first PED 1001 displays a video image of the environment together with a graphical representation of a virtual tennis ball 1010, with the tennis ball displayed as though it is stuck to the PED for subsequent launch by the player. As the first PED is physically moved within the real environment by its user, the virtual tennis ball is correspondingly moved within the virtual environment. In addition, an internal representation of the first PED is similarly moved within the virtual environment. The internal representation of the PED may simply be the position of the PED within the virtual environment, relative to the common reference position. Alternatively, in addition to the first PED's position, the internal representation of the PED may comprise a virtual representation of the PED, such as a 3D mesh, at the PEDs position in the virtual environment. This virtual representation of the PED enables realistic interactions with virtual objects such as the tennis ball, as it is possible to calculate where on the virtual representation of the PED the virtual tennis ball hits, and so how the virtual tennis ball will subsequently behave. Optionally, the virtual representation of the PED may not correspond to its physical characteristics. For example it may be larger or smaller in the virtual environment than in the real world, or may be shaped like a tennis racquet, or may have different physical properties, for example being springy or resilient, in order to affect how it interacts with other virtual objects such as the virtual tennis ball.

So, the real position of the PED may define a virtual representation in the virtual environment. That virtual representation may be different in size, shape and properties to the PED itself it is the size, shape and properties of the virtual representation that are used to determine interactions with one or more other virtual objects such as the virtual tennis ball.

The user launches or serves the ball, for example either by pressing a button, an area on a touch surface, or with a flicking action applied to the first PED. The ball is given a velocity based on the position, orientation and possibly motion of the PED at launch, and travels through the virtual environment following simple physical laws or variants of such laws.

The first PED communicates the calculated coordinates of the tennis ball to the second PED 1002, together with other variables defining the future path of the ball such as direction, velocity, and spin, as appropriate. Optionally the first PED also communicates its own movements or position in the common coordinate system to the second PED, for example if the second PED is to display a virtual representation of the first PED, or augment a video image encompassing the first PED. Such communications can use a common time frame, including timing signals or a counter coupled to local clocks in each PED. The initial and/or subsequent synchronisation of such timing systems between devices is well known and is not described further.

Both PEDs, having their own respective positions and the position of the ball within the shared virtual environment, can display the ball within the shared virtual environment if their user moves their respective PED so that its screen shows a field of view encompassing the ball's position.

Where the PEDs also show a video capture of the environment as though viewed through an aperture where the screen is, the effect is for each PED to become both a so-called 'magic window' into the shared virtual world and also a transparent tennis racquet, so that the user can look 'through' the PED at the real environment, and also see the tennis ball flying toward or away from them.

Using the user's ability to see the virtual tennis ball 'through' their PED, the second user can move the second PED to intersect with the virtual flight of the ball.

In an embodiment of the present invention, all computation of the ball's behaviour is calculated by one of the PEDs (for example, the PED that initially introduced the ball into the shared virtual environment).

In another embodiment, the second PED, having immediate access to its own position, motion and orientation data, calculates how the ball intersects with it and computes a new trajectory for it, thereby taking over control of the ball within the shared virtual environment.

In this way, control of the ball is handed back and forth between the PEDs according to which device last caused a change to the ball's behaviour. For example, a PED may retain control of the ball's trajectory until the ball interacts with (is hit by) another PED, at which time control is handed to that other PED by a wireless handshake between the two PEDs.

More generally this approach can be applied to share any virtual object in the shared virtual environment; for example, whichever PED 'shoots' a target (e.g. is correctly aligned by a user to shoot a virtual target in a game) takes control of the consequences of shooting it, and of communicating those effects to the or each other PED sharing the virtual environment.

However, optionally in either of the above embodiments, one PED operates as a master device for performing such tasks as maintaining overall scores, or introducing new virtual objects into the shared environment, or co-ordinating such introduction with the or each other PED.

In any event, the position of such virtual objects can be expressed either relative to one of the PEDs or with respect to a common reference (where available), such as the common reference position 1010 or the AR marker 1020.

In operation, the PEDs communicate with one another using their wireless communications units 140. What they communicate and how often may be application dependent. For example, the PEDs may define the shared virtual environment by transmitting a code indicating a predefined virtual environment (for example, a virtual tennis court predefined as part of a game stored on each PED), or transmitting parameters providing bounds on a virtual space (as described later). Alternatively, as noted previously the shared virtual environment may simply be (at least initially) just the common co-ordinate system used to define the positions of one or more virtual objects in a virtual environment.

Other communications between PEDs may again depend upon the application (for example, a tennis game may require more rapid positional updates than a treasure-hunt game), and may also be made dependent upon the amount of movement (change of position) that a particular PED detects. Thus, as non-limiting examples, PEDs may share information about their own movements every 10 ms or every second, depending on application and circumstance. Similarly, PEDs may share information about the calculated movements of virtual objects at a similar range of rates.

In the tennis game example described previously (or any other application), it will be appreciated that the estimated positions of the PEDs may not be perfectly consistent with one another, for example due to possible accelerometer drift in motion tracking or cumulative sub-pixel motion estimation errors in optical flow measurements.

In some applications this does not matter; for example if there is in effect a 10 centimetre positional drift between the estimates by the two devices, the second user is unlikely to notice as they track the flight of the tennis ball from the first PED that the second PED estimates itself to be 10 centimetres from its correct position with respect to the room. Rather the user will still move the second PED to intersect with the ball, thereby compensating for the positional error; unless the error happens suddenly, such drift or cumulative error is unlikely to matter.

For other applications where consistent accuracy does matter, then the provision of a reference AR marker allows either for ongoing direct and consistent reference to the marker, or for frequent recalibration or adjustment of the motion tracking or optical flow positional estimates with respect to the marker.

Referring to FIGS. 6A to 6D, alternatively or in addition one or more AR markers or other characteristic identifying features can be included on the PEDs themselves, at suitable positions to be visible in use to other PEDs (for example, on the face of the PED opposite the display, and/or on one corner of the PED). Examples include a static or flashing coloured LED or a colour or pattern on a display, the colour of the PED itself, or a pattern printed on the PED. Such AR markers enable each PED to measure a disparity or error between the other PED's relative position in the virtual environment and its relative position in the real environment, the positions being relative to the first PED (since as noted previously, the real and virtual environments are at a similar scale and so the real and virtual relative positions should be substantially the same). It is not necessary that each PED does this—the operation can be carried out by one PED. However, if each PED does the same operation then the results can be cross-checked against one another (they should represent the same error, although possibly in a mirror-image form).

Figure 6A:
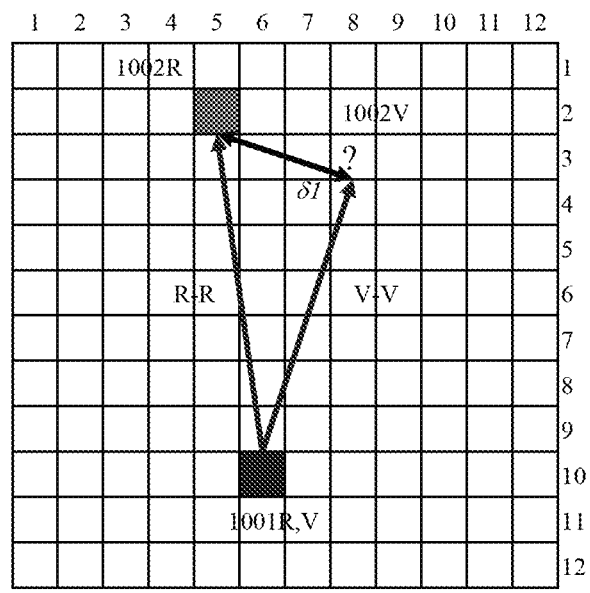
FIGS. 6A to 6D are schematic diagrams illustrating techniques for improving disparities between physical and virtual position estimates.

In FIG. 6A, a schematic plan view of the coincident real and virtual environments has, for the purposes of explanation, been divided into a common grid of arbitrary resolution and scale. On this grid the first PED 1001 has not drifted in its estimate of position and is located at grid position [6,10] in both the virtual and real environments (positions 1001V and 1001R). Meanwhile the second PED has undergone position estimate drift, and estimates its virtual position (1002V) to be [8,3], whilst its real position (1002R) is [5,2].

As a result, if the first PED 1001 is oriented to face the second PED 1002 based upon their relative virtual positions, then the first PED will not face the second PED in reality (the different view points are marked V-V for virtual to virtual viewpoint, and R-R for real-to-real viewpoint). The positional difference 81 is likely to be confusing for the users and may interfere with gameplay.

Figure 6B:
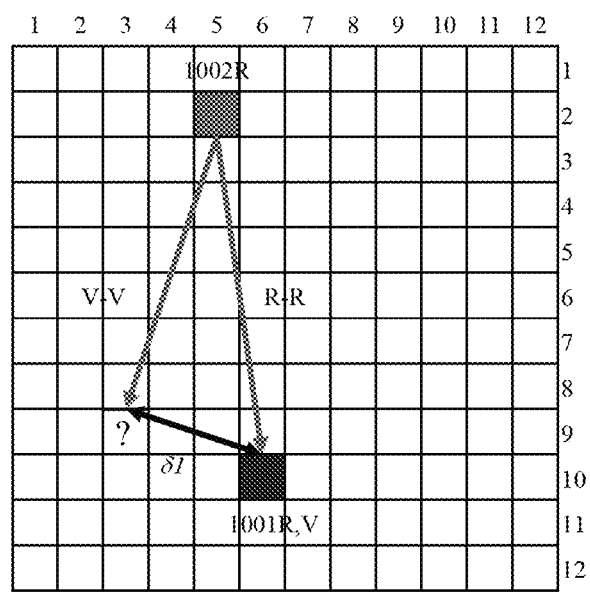

Referring to FIG. 6B, the second PED will experience a mirror-image version of the same problem, where orienting towards the first PED based upon respective virtual positions does not result in orientation towards the first PED in reality, because the second PED is incorrectly positioned in reality, relative to the virtual position assumed by the first PED.

As noted above, one solution is to calibrate the PEDs with reference to a common AR marker or other established reference object, like a television or window; however, these (or the facility to use them) may not be available. Where no prior reference has been established with the real environment in this way (appreciating that the common reference position 1010 is only with respect to the PEDs), then the PEDs themselves cannot detect which one of them is in error (or indeed if both are in error).

Figure 6C:
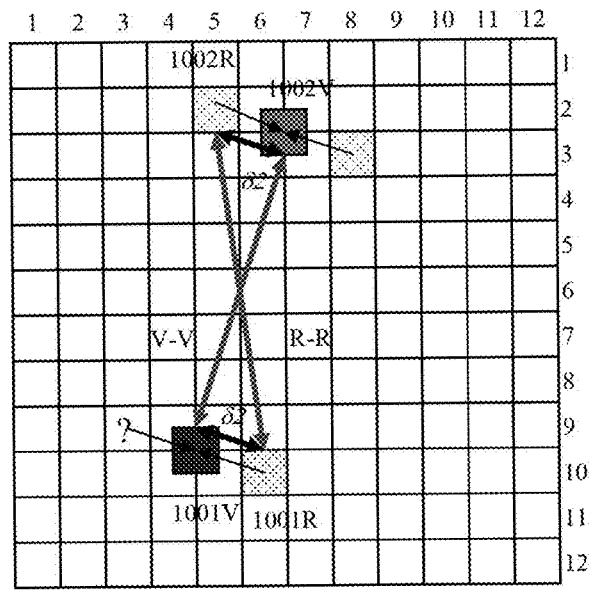

Consequently, referring to FIG. 6C, the PEDs can derive an averaged correction factor where they take the average position between real and virtual relative positions as a new relative position. Their relative physical position can be derived by using captured video from each PED to locate the other PED, and using the respective PED's estimate of its own virtual position in conjunction with the other PED's, calculate the difference in position between real and virtual PEDs. The new virtual positions exhibit a new disparity β2 between the real and virtual environments that is half the previous disparity, thereby reducing confusion for the users. Repeated estimates at different times (and hence, typically different relative positions) enables the disparity to be reduced repeatedly. Potentially only one of the PEDs needs to derive the relative physical position between a pair of PEDs.

Figure 6D:
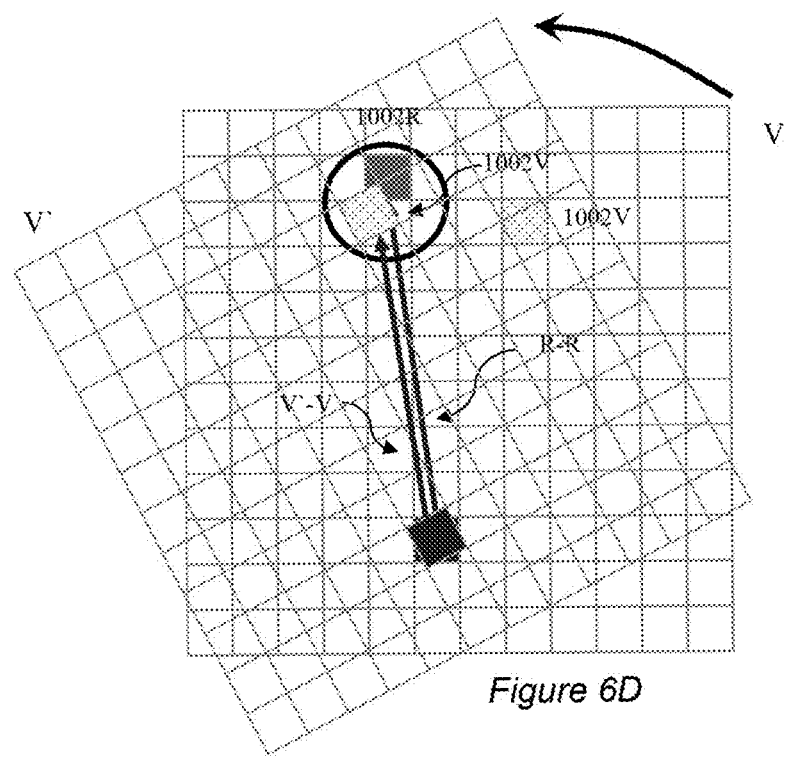

Alternatively or in addition to the method of FIG. 6C, referring now to FIG. 6D the PEDs can rotate their own representation of the virtual environment to map on to the observed reality. In FIG. 6D, the virtual environment co-ordinate system V is rotated to form rotated coordinate system V', such that the rotated virtual position 1002V' of the other PED is coincident, at least directionally, with the real position 1002R in the original co-ordinate system (as indicated within the circle in FIG. 6D). The co-ordinate system may be rotated about any suitable point, but is typically rotated either about the position of the PED (as shown in FIG. 6D) or about the origin of the co-ordinate system. If reliable distance estimates can also be made from the captured video image (which may depend for example on the available resolution of the video image) then the virtual environment may also be scaled to be consistent with the physical distance between PEDs if required.

It will be appreciated that the PEDs can include a positional error tolerance by detecting in the captured video image whether the other PED occupies a threshold region (e.g. a threshold image region) centred on a physical position corresponding to the other portable electronic device's virtual position within the shared virtual environment. In other words a first PED, having its own position and orientation in the common co-ordinate system, and receiving the position of a second PED in the common co-ordinate system, can calculate (i.e. predict) where the second PED should appear in an image of the real environment captured by its camera. The first PED can then detect whether the apparent position of the second PED deviates from this calculated position. If the second PED's position deviates by a threshold amount (i.e. a radius from the calculated position, forming a circular threshold in the image plane that should encompass the second PED), or likewise the second PED cannot be detected within the area bounded by such a circular threshold, then one of the above error mitigation methods may be initiated. The threshold radius applied to the captured image can be scaled in accordance with the distance between the PEDs in the common co-ordinate system.

In an embodiment of the present invention, limits on the real, physical space can be detected and used to limit the shared virtual environment.

For example, once two or more PEDs have established relative positions with respect to one another using a technique as described above, one or more of them may be moved to the walls, floor and (if possible) the ceiling of a room to define the corresponding boundaries of the virtual environment, for example pressing a button on a PED (such as a soft button corresponding to an on-screen list of six surfaces of a room). The PEDs can share the information wirelessly between them as it is gathered. The shared virtual environment may thus be bound so that, for example, a tennis ball will appear to bounce realistically off the walls of the room, or virtual creatures will not stray beyond the limits of the room.

Other objects in the room may be similarly mapped, either using button presses to sample the space they occupy, or using pre-set structures and then sampling parameters from the objects (e.g. 'sofa' or 'table' structures, which can be characterised by a few measurements such as height, width and length).

The properties of a room can be stored for future recall, and can be re-established relative to the PEDs later on by placing a PED in a particular corner of the room, for example.

This also provides a means of re-calibrating PEDs, by, for example, placing them in respective corners of a known room and commanding them to align their virtual positions with these known real positions.

In principle, the shared virtual environment and the real environment need not be wholly coincident.

For example, two people in their own respective homes could each select a room as their half of a tennis court, and each place an AR marker in the centre of one wall of that room. The PEDs then share a virtual environment where the common reference point is their copy of the AR marker. In this way, the users can treat the wall in their respective rooms as the net in a shared virtual tennis court. Because the other user is not visible, an animation corresponding to the user's position in the virtual world can be used, with animations selected to be suitable for the detected motion of their PED. Such animations can extrapolate the user's position by assuming the user is holding the PED in their hand; using the PEDs position, the user's position can then be estimated.

It will be appreciated that whilst the above techniques are applicable to augmented reality, as typified by the tennis game described herein, optionally the real environment need not be captured via a video camera, and the PED may display only the virtual environment when playing a game. In this case, a PED may not require a video camera.

Consequently it will be appreciated that not all PEDs need to be identical devices, although this is more likely to result in satisfying co-operative play. For example, not all PEDs may have video cameras, or not all PEDs may have displays. The modes of position detection and the games or applications that the PEDs can implement will vary accordingly.

It will also be appreciated that the PEDs can operate in an ad-hoc fashion, i.e. by forming ad-hoc networks between one another without reference to a central server or other facilitator.

Figure 7:
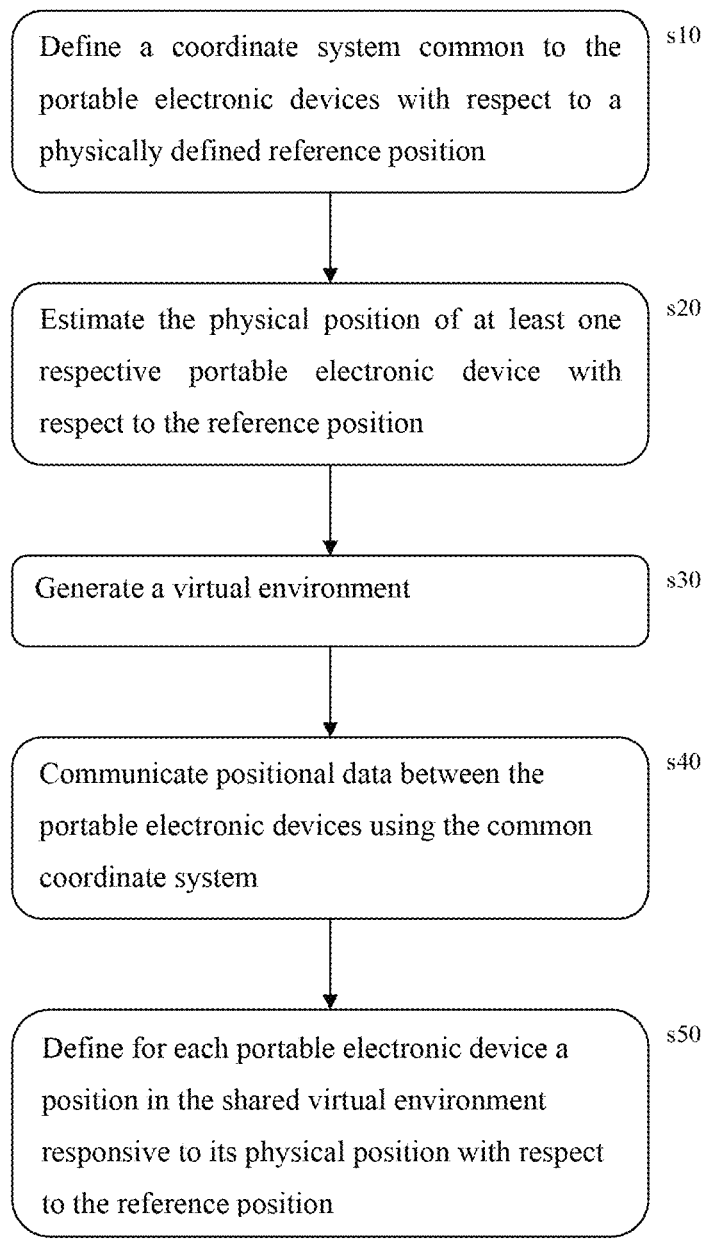
FIG. 7 is a flow diagram of a method in accordance with an embodiment of the present invention.

Referring now to FIG. 7, a method of virtual interaction comprises:

in a first step s10, defining a coordinate system common to the portable electronic devices with respect to a physically defined reference position;

in a second step s20, estimating the physical position of at least one respective portable electronic device with respect to the reference position;

in a third step s30, generating a virtual environment;

in a fourth step s40, communicating positional data between the portable electronic devices using the common coordinate system; and, for a virtual environment that is shared in common between the portable electronic devices, the virtual environment using the common co-ordinate system, in a fifth step s50, defining for each portable electronic device a position in the shared virtual environment responsive to its physical position with respect to the reference position.

It will be apparent to a person skilled in the art that variations in the above method corresponding to operation of the various embodiments of the apparatus as described and claimed here are considered within the scope of the present invention, including but not limited to:

i. each PED having one or more accelerometers (i.e. accelerometers and/or gyroscopes); and estimating is physical position with respect to the reference position from cumulative changes in physical position calculated from detected acceleration of the PED;

ii. each PED having a video camera operable to capture a sequence of video images, and using so called 'optical flow' to estimate physical motion of a respective PED that accounts for apparent motion in the sequence of video images captured by that PED's video camera, and estimating a physical position of that PED with respect to the reference position from cumulative estimated motion;

iii. each PED having a video camera operable to capture a sequence of video images, and estimating a physical position of the PED with respect to the reference position based upon distortion characteristics (e.g. scale, rotation, viewing angle) of a reference object located at the reference position, as captured in a video image by the video camera;

iv. each PED having wireless identification signal transmitter and wireless signal triangulator, and the PEDs using these to triangulate their relative physical positions with respect to one another;

v. selecting one mode of position estimation in preference to another, where two or more are available, vi. optionally dependent upon the application that is to be used, and/or upon a lack of detected features (e.g. where no AR card is detected);

vii. where two or more modes of position estimation are available, using one to adjust the operation of another (for example, using an AR card to estimate position may be accurate when the AR card is visible, but in some uses where it is not always visible, it may be preferable to use motion tracking that is regularly calibrated with reference to the AR card when it becomes visible);

viii. detecting drift or other errors/disparities in the positional estimate of at least one of the PEDs by comparing the virtual relative position of two PEDs with their relative physical positions, ix. for example by analysing a video image captured by one PED to detect whether another PED occupies a threshold region centred on a physical position corresponding to the other PED's virtual position within the shared virtual environment;

x. combining virtual objects with video capture of the physical environment on a display screen;

xi. sharing control of a virtual object within the shared virtual environment, for example by passing control to another PED when that other PED interacts with the object in some fashion, or signals that it is about to do so; and xii. defining one or more boundaries of the shared virtual environment by placing one or more PEDs on walls, floors etc of the physical space, and the PED(s) noting their positions in the virtual environment as equivalent boundaries.

Finally, it will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product or similar object of manufacture comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A system for virtual interaction, comprising:
two or more portable electronic devices, each device comprising in turn:
a coordinate referencer configured to define a new coordinate system common to said portable electronic devices with respect to a real, physically defined common reference position in a real-world space currently shared by said portable electronic devices, where said common reference position is a point where said portable electronic devices are placed physically adjacent to one another;
a position estimator configured to detect a physical position of its respective portable electronic device with respect to said reference position;
a virtual environment generator configured to generate a virtual environment; and
a communicator configured to transmit positional data using said common coordinate system from that portable electronic device to another portable electronic device; and in which
said virtual environment is shared in common between said portable electronic devices, said virtual environment using said common co-ordinate system within which each portable electronic device defines a position for itself responsive to its physical position with respect to said common reference position.

2. A system for virtual interaction according to claim 1, in which the position estimator of at least one of said portable electronic devices comprises:
one or more accelerometers; and
a motion tracker configured to estimate a physical position with respect to said reference position from cumulative changes in physical position detected using said one or more accelerometers.

3. A system for virtual interaction according to claim 1, in which said position estimator of at least one of said portable electronic devices comprises:

a video camera configured to capture a sequence of video images; and an optical flow estimator configured to estimate a change in physical position of a respective portable electronic device as a motion that would account for apparent motion in said sequence of video images captured by the video camera, and to estimate a physical position with respect to said reference position from cumulative estimated changes in physical position.

4. A system for virtual interaction according to claim 1, in which the position estimator of at least one of said portable electronic devices comprises:

a video camera configured to capture a sequence of video images; and an image processor configured to estimate a physical position of the portable electronic device based upon distortion characteristics of a captured video image of a reference object at said reference position.

5. A system for virtual interaction according to claim 1, in which the position estimator of at least one of the portable electronic devices comprises:

a wireless identification signal transmitter; and a wireless signal triangulator; and in which the at least one of said portable electronic devices triangulates its relative physical position with respect to another one of said portable electronic devices.

6. A system for virtual interaction according to claim 1, in which at least one of said portable electronic devices comprises two or more position estimators; and in which the at least one of said portable electronic devices is configured to use a second position estimator to adjust the operation of a first position estimator.

7. A system for virtual interaction according to claim 1, in which at least one of said portable electronic device comprises:

a video camera configured to capture a video image; and in which the at least one said portable electronic device is configured to detect an error in the correspondence between the real relative position of another portable electronic device and the relative position of the other portable electronic device within said common coordinate system, by analysing a captured video image to detect whether said other portable electronic device lies within a region of said captured video image predicted to encompass to the position of the other portable electronic device based upon its position within said common coordinate system.

8. A system for virtual interaction according to claim 1, in which at least one of said portable electronic devices comprises:

a video camera configured to capture a video image; and a display screen; and in which the at least one said portable electronic device is configured to display a captured video image of the physical environment on said display screen in conjunction with one or more virtual objects included in said shared virtual environment.

9. A system for virtual interaction according to claim 1, in which control of at least one virtual object within said shared virtual environment is shared between said two or more portable electronic devices.

10. A system for virtual interaction according to claim 1, in which boundaries of said shared virtual environment are defined by moving one or more of said portable electronic devices to one or more boundaries of a physical environment and noting the corresponding position of the or each portable electronic device within said shared virtual environment.

11. A method of virtual interaction between two or more portable electronic devices comprises the steps of:

defining a new coordinate system common to said portable electronic devices with respect to a real, physically defined common reference position in a real-world space currently shared by said portable electronic devices, where said common reference position is a point where said portable electronic devices are placed physically adjacent to one another;

estimating a physical position of at least one portable electronic device with respect to said reference position;

generating a virtual environment;

communicating positional data between said portable electronic devices using said common coordinate system; and in which said virtual environment is shared in common between said portable electronic devices, the virtual environment using the common co-ordinate system;

and for each portable electronic device, defining its position in said shared virtual environment responsive to its physical position with respect to said common reference position.

12. A method of virtual interaction between two or more portable electronic devices according to claim 11, in which the step of estimating the physical position of the at least one respective portable electronic device comprises one or more selected from the list consisting of:

i. estimating the physical position with respect to said reference position from cumulative changes in physical position calculated from detected acceleration of said respective portable electronic device;

ii. estimating a physical motion that accounts for apparent motion in a sequence of video images captured by a video camera of said respective portable electronic device, and estimating the physical position with respect to said reference position from cumulative estimated motion;

iii. estimating the physical position with respect to said reference position based upon distortion characteristics of a captured video image of a reference object at said reference position, captured by a video camera of said respective portable electronic device; and iv. estimating a relative physical position with respect to another portable electronic device based upon triangulated wireless identification signals.

13. A method of virtual interaction between two or more portable electronic devices according to claim 11, comprising the step of:

passing control of at least one virtual object within said shared virtual environment between said two or more portable electronic devices, so as to allocate control of said virtual object to a portable electronic device which most recently interacted with said virtual object.

14. A method of virtual interaction between two or more portable electronic devices according to claim 11, comprising the step of:

defining boundaries of said shared virtual environment by moving one or more of said portable electronic devices to one or more boundaries of a physical environment and noting the corresponding position of the or each portable electronic device within said shared virtual environment.

15. A non-transitory computer-readable storage medium on which computer readable instructions of a computer program are stored, the instructions, when executed by a computer, cause the computer to perform a method of virtual interaction between two or more portable electronic devices comprising:

defining a new coordinate system common to said portable electronic devices with respect to a real, physically defined common reference position in a real-world space currently shared by said portable electronic devices, where said common reference position is a point where said portable electronic devices are placed physically adjacent to one another;

estimating a physical position of at least one portable electronic device with respect to said reference position;

generating a virtual environment;

communicating positional data between said portable electronic devices using said common coordinate system; and in which said virtual environment is shared in common between said portable electronic devices, the virtual environment using the common co-ordinate system;

and for each portable electronic device, defining its position in said shared virtual environment responsive to its physical position with respect to said common reference position.

* * * * *